United States Patent [19]

Huang

[11] Patent Number: 5,051,087

[45] Date of Patent: Sep. 24, 1991

[54] INJECTION MOLDER WITH TWO MOVABLE MOLDS

[75] Inventor: Buming Huang, Guang Dong Province, China

[73] Assignee: The Shunde Plastics General Machine Enterprises Group, Guang Dong Province, China

[21] Appl. No.: 561,582

[22] Filed: Aug. 2, 1990

[30] Foreign Application Priority Data

Aug. 11, 1989 [CN] China .................... 89 1 06465.6

[51] Int. Cl.[5] ............................................. B29C 45/67
[52] U.S. Cl. ............................... 425/589; 425/450.1; 425/451.9
[58] Field of Search ............ 425/589, 591, 595, 450.1, 425/451.9, 574, 575

[56] References Cited

U.S. PATENT DOCUMENTS

| | | | |
|---|---|---|---|
| 3,594,869 | 7/1971 | Sher | 425/192 R |
| 4,105,385 | 8/1978 | Hehl | 425/192 R |
| 4,487,569 | 12/1984 | Hehl | 425/575 |
| 4,571,169 | 2/1986 | Shima et al. | 425/451.9 |
| 4,636,167 | 1/1987 | Shibata | 425/589 |

FOREIGN PATENT DOCUMENTS 204016   4/1987   China .
1031963  3/1989   China .
0200832  11/1986  European Pat. Off. .

*Primary Examiner*—Timothy Heitbrink
*Attorney, Agent, or Firm*—Stevens, Davis, Miller & Mosher

[57] ABSTRACT

An injection molder with two movable molds is composed of a mold-matching device, an injection device, a hydraulic system and an electric control system, which only uses two movable molds, by means of the action of same oil cylinder to continuously complete mold-matching, mold-separating, integrated movement, integrated recession and injection and technological processes without transform of various motions, and wherein, the pressure of the injection is used to lock molds, so the mold-locking force is larger. The molder is short in total length, small in size, compact in structure and low in manufacturing cost, and can be used not only for a plunger injection molder and a screw injection molder, but also for other special injection molders or precision injection molders.

8 Claims, 7 Drawing Sheets

INJECTION MOLDER WITH TWO MOVABLE MOLDS

BACKGROUND OF THE INVENTION

1. Field of the Invention

The present invention relates to a new kind of injection molder which can be used for the injection molding of plastics, rubber and other plastic materials.

2. Description of the Prior Art

A traditional injection molder is generally composed of a mold-matching device, an injection device, a hydraulic system and an electric control system, wherein, the mold-matching device and the injection device are usually independent from each other and are hardly connected with each other. Therefore, the injection force is not relative to the mold-matching force, and the reaction of the injection force cannot be used to lock molds. Recently, a mold-matching device with four oil cylinders has been proposed wherein the four oil cylinders replace one large oil cylinder used in a traditional injection molder, to simplify its manufacture. The device only uses two mold plates in which one is fixed, and the mold-matching oil cylinder is mounted on one mold plate. Because the oil cylinder is not supported effectively bending of the tension rod is unavoidable. If the tension rod is bent the device does not work in a normal manner. Because the mold-matching speed is slow it is necessary to raise the mold-matching speed. Thus, a speed-increasing oil cylinder or a supercharging device must be added, and therefore the hydraulic system becomes more complex. U.S. Pat. No. 4,636,167 proposes a new kind of injection molder in which the injection pressure acting on the injection piston is used to lock molds so as to increase the molding-locking force. The mold-matching is completed by two actions which results in increasing the mold-matching time, for example, a driving device (e.g., an oil cylinder) must be used to drive and to move the sluice valve. Because the nozzle cannot be removed from the mold, it is inconvenient to assemble and disassemble the plunger and to clean the pouring head. This does not meet the requirements of general injection technology. Since the injection molder is not equipped with a screw-driving unit, it can be only used in a small-size plunger injection molder, therefore it has only limited application.

The purpose of the present invention is to overcome the disadvantages of the above injection molds and to provide a new kind of high-speed and high-efficiency injection molder with two movable molds in which only two movable mold plates, which are movable by means of one continuous action of an oil cylinder, are used to complete mold-matching, mold-separating and integrated movement, integrated recession and injection, and technological processes. Another purpose is to manufacture a device which is simple in structure, high in precision, convenient in mold-adjusting, small in size, easy to manufacture and low in cost.

SUMMARY OF THE INVENTION

The characteristic of the present invention is that there are only two mold plates in the mold-matching device, and the two mold plates are all movable. When high pressure oil continuously flows into the general oil cylinder through its end, the motion of its piston can drive the tension rod to complete mold-matching, mold-separating, integrated movement, integrated recession and injection, and technological processes without the transformation of various motions.

The injection molder with two movable molds proposed by the present invention is composed of a mold-matching device, an injection device, a hydraulic system and an electric control system wherein only two movable mold plates, a first movable mold plate and a second movable mold plate are arranged in said mold-matching device. These two movable mold plates are slidingly and vertically mounted on the frame guide track and can move along the frame guide track reciprocally. A pair of split molds are mounted on facing sides which correspond to the first movable mold plate and the second movable mold plate; several tension rods are arranged in a parallel relationship on the first movable mold plate and the second movable mold plate. The left end of the tension rod is fixed on the first movable mold plates, and the right end of the tension rod is concentrically connected with the left end of the piston in each general oil cylinder and mold-locking oil cylinder respectively. The tension rod passes through the second movable mold plate, and the second movable plate is fitted at the middle part of the tension rod so that they can move relatively. A driving stand is vertically fixed on the other end of frame guide track relative to the first movable mold plate, and an injection stand is slidingly and vertically mounted on the frame guide track between the driving stand and the second movable mold plate, which can move along the frame guide track. Several general oil cylinders are fixed on the left side of the driving stand and are fixed between the driving stand and the second movable mold plate and are slidingly inserted in the injection stand which can move relative to the general oil cylinder. The general oil cylinders are arranged asymmetrically around the center of the movable mold plate. The rear piston rod of the piston in the general oil cylinder passe through the driving stand and can slide on said driving stand. Several mold-locking oil cylinders are fixed on the right side of second movable mold plate between the second movable mold plate and injection stand. The movable locking oil cylinders are also arranged axisymmetrically around the center of the movable mold plate, but they are interlaced with above mentioned general oil cylinders. The rear piston rod of the piston in the mold-locking oil cylinder passes through the injection stand and can slide in the injection stand. The injection device includes a nozzle, a charging cylinder, a screw stem wherein the charging cylinder is fixed on the injection stand and moves together with the injection stand. The nozzle is fixed on the end of the charging cylinder and toward the pouring head of the second movable mold plate. The screw stem of the screw stem driving device fixed on the driving stand is mounted in the charging cylinder and can rotate and slide in the charging cylinder. The maximum stroke of the general oil cylinder is slightly greater than or equal to the sum of the stroke of the first movable mold plate, the maximum distance between the mold pouring head and the nozzle and the injection stroke of the screw stem. The tension rod can also be the front piston rod which is integrated with the piston in the general oil cylinder and mold-locking oil cylinder. It is also practical that the injection stand is fixed, and the driving stand is slidingly and vertically mounted on the frame guide track. The number of general oil cylinder and said mold-locking oil cylinder can be one, two or more.

DESCRIPTION OF THE PREFERRED EMBODIMENTS

First embodiment is hereinafter detailed by referring to FIG. 1 through FIG. 5.

Figure 1:
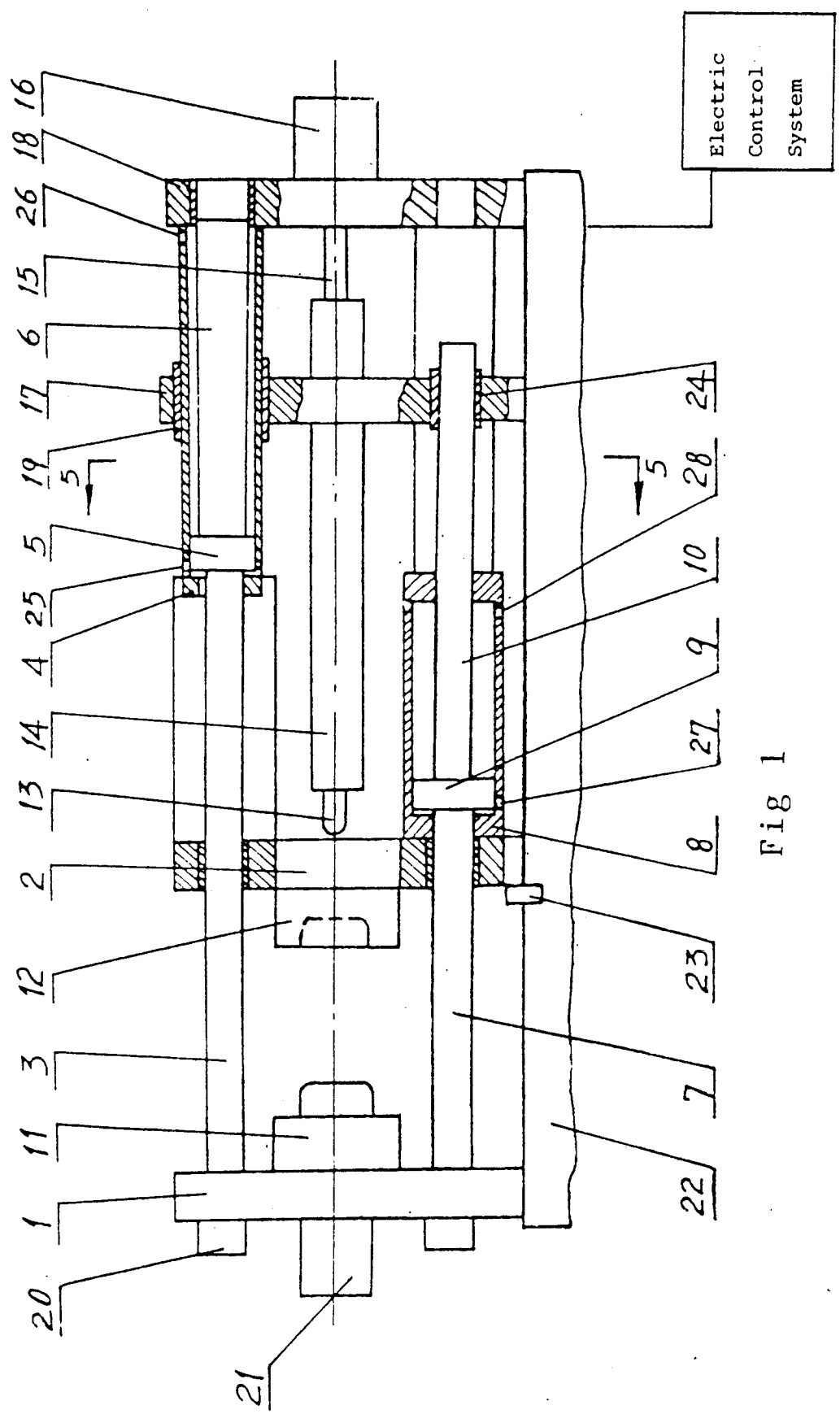
FIG. 1 is a schematic view of the present invention when the mold is separated.

FIG. 1 is a schematic view of the present invention. The mold-matching device comprises mold plates 1 and 2, tension rods 3 and 7, general oil cylinders 4, mold-locking oil cylinders 8, an injection stand 17 and a driving stand 18. The injection device comprises a nozzle 13, a charging cylinder 14 and a screw stem 15. There are only two mold plates 1 and 2 in the mold-matching device: first movable mold plate 1 and second movable mold plate 2, which can move on the frame guide track 22. Two axisymmetrically arranged tension rods 3 and two axisymmetrically arranged tension rods 7 are parallel to each other and are interlaced with each other. The first mold plate 1 is fixed at the far left-hand end of tension rod 3 and the left-hand end of tension rod 7 by means of nut 20, and together with the tension rods 3 and 7, first mold plate 1, can move reciprocally along the frame guide track 22 and move toward the second movable mold plate 2. The tension rod 3 passes through the second movable mold plate, and the second movable mold plate 2 is fitted to the middle part of the tension rod 3 and at the right-hand end of the tension second rod 7 and can move relative to the tension rod 3 and 7. The second movable mold plate 2 can also move reciprocally along the frame guide track 22 and toward the nozzle 13. A positioning key 23 is mounted on the frame guide track 22 and on left-hand side of second mold plate 2 so as to position second mold plate 2 when it moves leftward. Two axisymmetrically arranged general oil cylinders 4 are fixed on the driving stand 18 and can slide in the guide sleeve 19 on the injection stand 17. One end of piston 5 is concentrically connected with the right-hand end of the tension rod 3, and the other end of piston 5 is connected with the rear piston rod 6. The total length of the general oil cylinder can be slightly greater than or equal to the sum of the stroke of the mold plate, the maximum distance of the pouring head of the mold and the nozzle, and the injection stroke. Two axisymmetrically arranged mold-locking oil cylinders 8 are mounted on the right side of second mold plate 2. The left end of piston 9 which is concentrically connected with the right-hand end of the tension rod 7, and to the rear piston rod 10. The right end of the rear piston rod 10 can slide in the guide sleeve 24 on the injection stand 17. The injection stand 17 is situated between the mold-locking oil cylinder 8 and the driving stand 18. If the driving stand 18 is fixed on the frame, injection stand 17 can move on the frame guide track 22. A charging cylinder 14 is arranged on the center of the injection device and is fixed on the center of the injection stand 17. A nozzle 13 is mounted on the left-hand end of the charging cylinder 14, and a screw stem 15 is inserted in the charging cylinder 14 and can rotate and slide in the charging cylinder 14 to convey the injection material. A screw stem driving device 16 is fixed on the driving stand 18. A convex mold 11 is fixed on the first mold plate 1, and a concave mold 12 is fixed on the second mold plate 2. A liftout oil cylinder 21 is fixed on the first mold plate 1.

Figure 2:
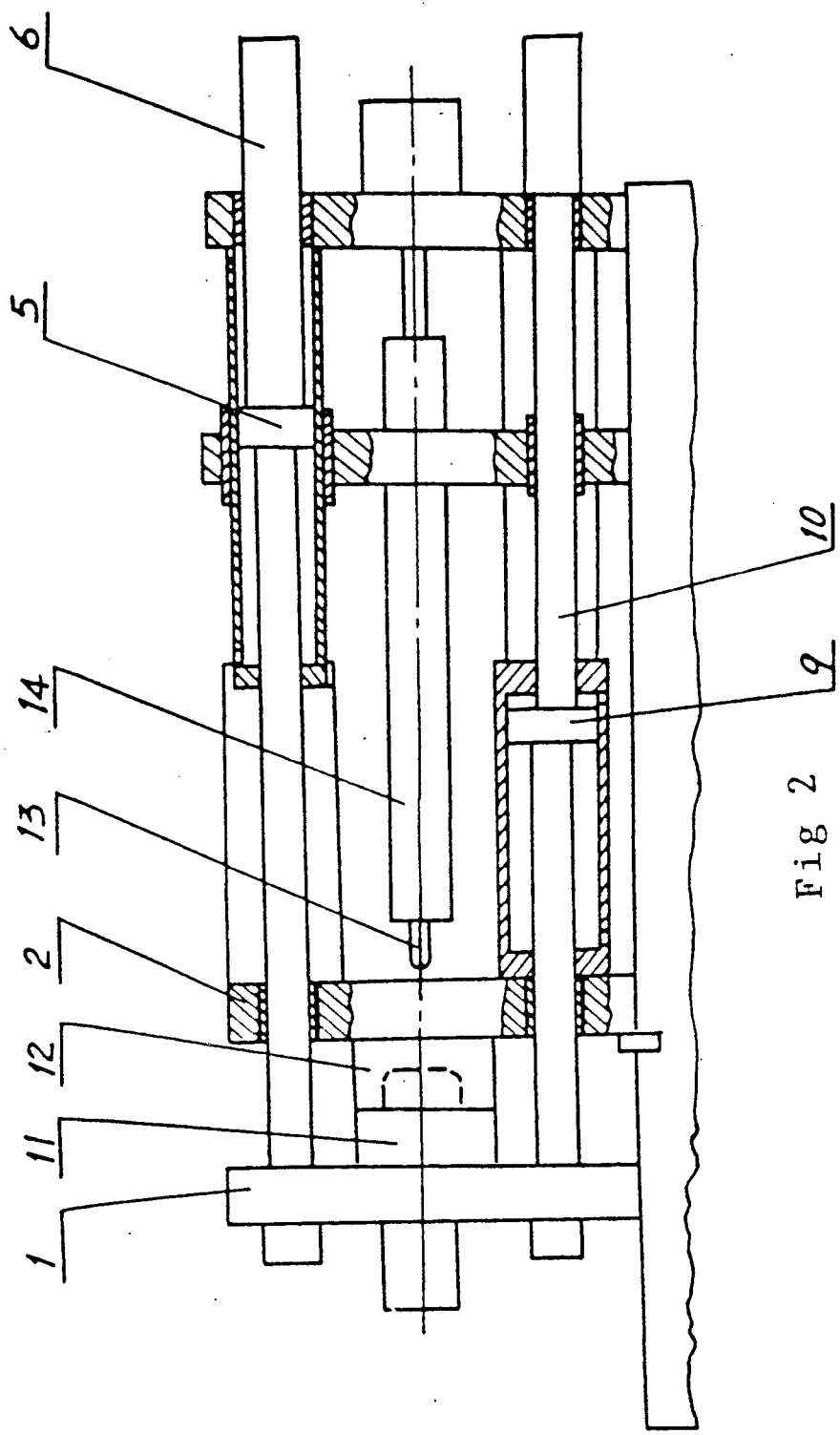
FIG. 2 is a schematic view of the present invention when the mold is matched.

The technological processes of the present invention are hereinafter detailed referring to FIG. 1 through FIG. 5;

Mold-matching process: High pressure oil flows into the general oil cylinder 4 through the left oil port 25, and the right oil port 26 communicates with a zero-potential oil tank; at the same time, the left oil port 27 and the right oil port 28 of the mold-locking oil cylinder 8, all communicate with the zero-potential oil tank. High pressure oil pushes the piston 5 in the general oil cylinder 4 to move rightward to drive the tension rod 3 and the first mold plate 1 toward the second mold plate 2 for mold-matching, and at the same time, the piston 9 in the mold-locking oil cylinder 8 moves rightward. When the two molds touch and mate with each other, high pressure oil begins to flow into the mold-locking oil cylinder 8 through the left oil port 27. Under the action of the high pressure oil, the piston 9 applies a locking force on the two mold plates 1 and 2 by means of tension rod 7, so as to force the molds 11 and 12 together (as shown in FIG. 2).

Figure 3:
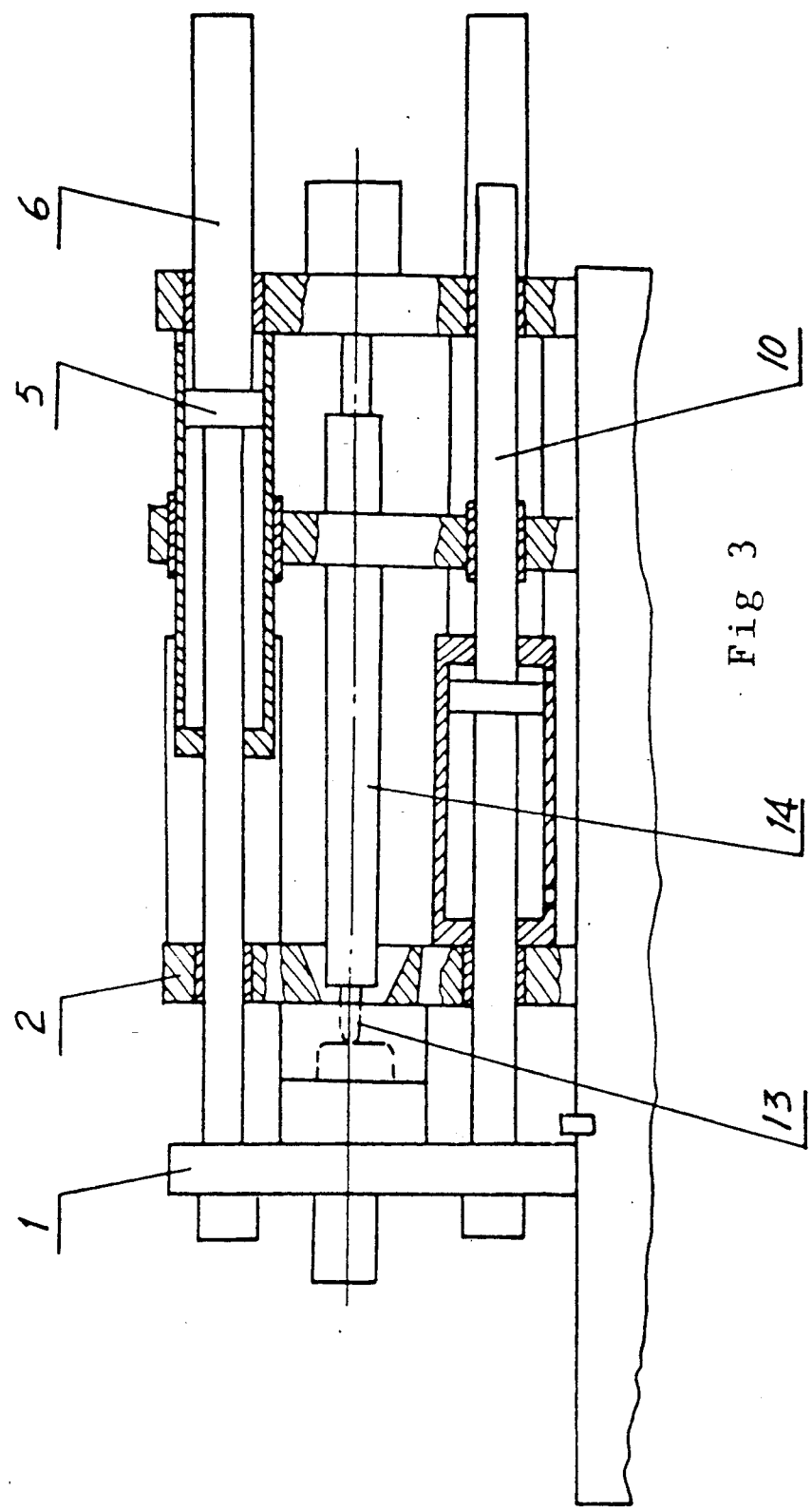
FIG. 3 is a schematic view of the present invention when the integrated movement is completed.

Integrated movement (i.e., the mold plate moves toward the nozzle 13 so as to make the nozzle 13 and the pouring head of the mold press each other): following the above process, high pressure oil keeps on flowing into the general oil cylinder 4 through left oil port 25, and the piston 5 keeps moving rightward; the tension rod 3 drives two locked mold plates 1 and 2 to continue moving toward the nozzle 13 and makes the nozzle 13 press the pouring head of the mold 12; and then the nozzle opens (as shown in FIG. 3).

Figure 4:
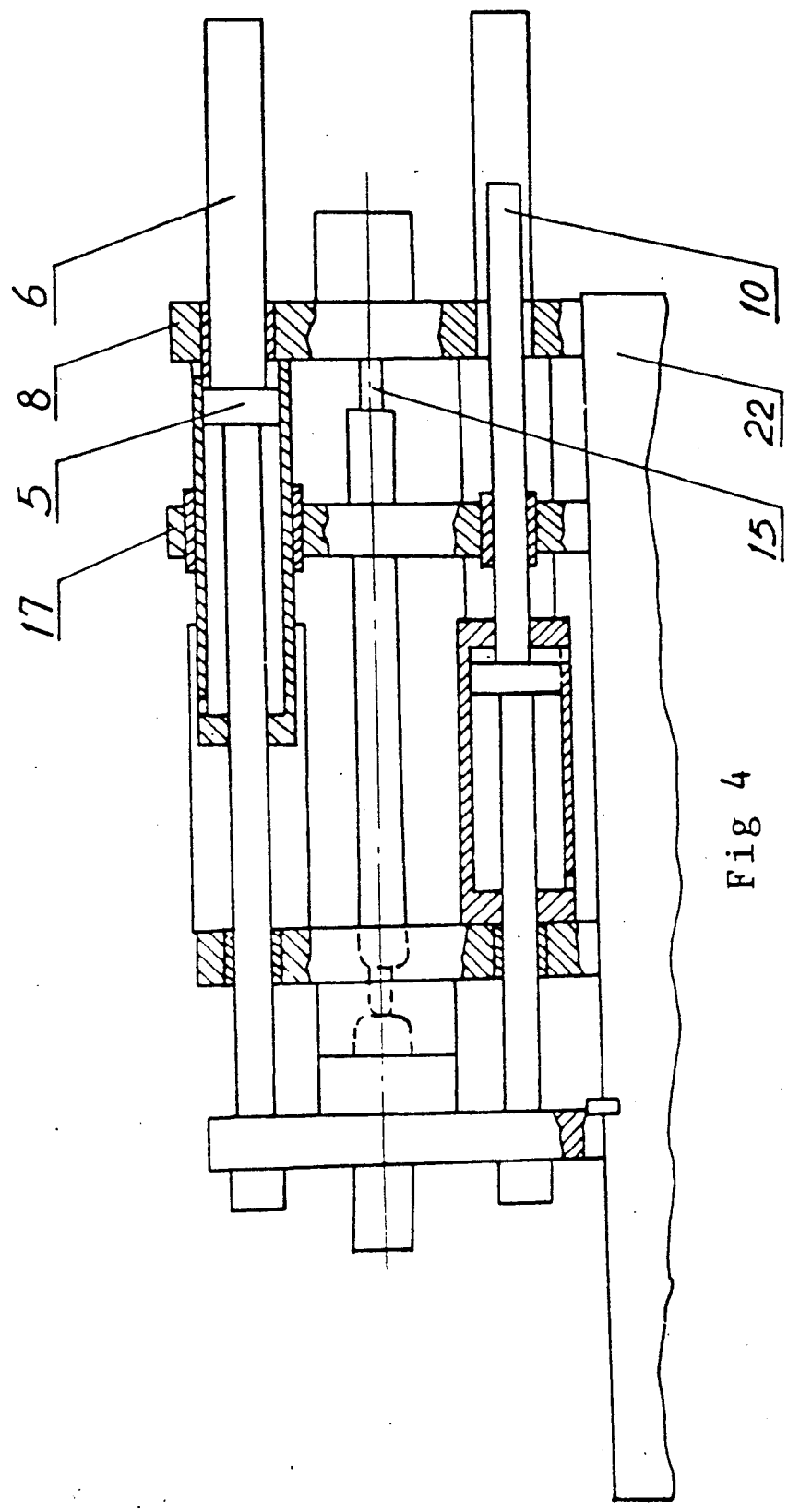
FIG. 4 is a schematic view of the present invention when the injection is completed (driving stand is fixed)
Figure 5:
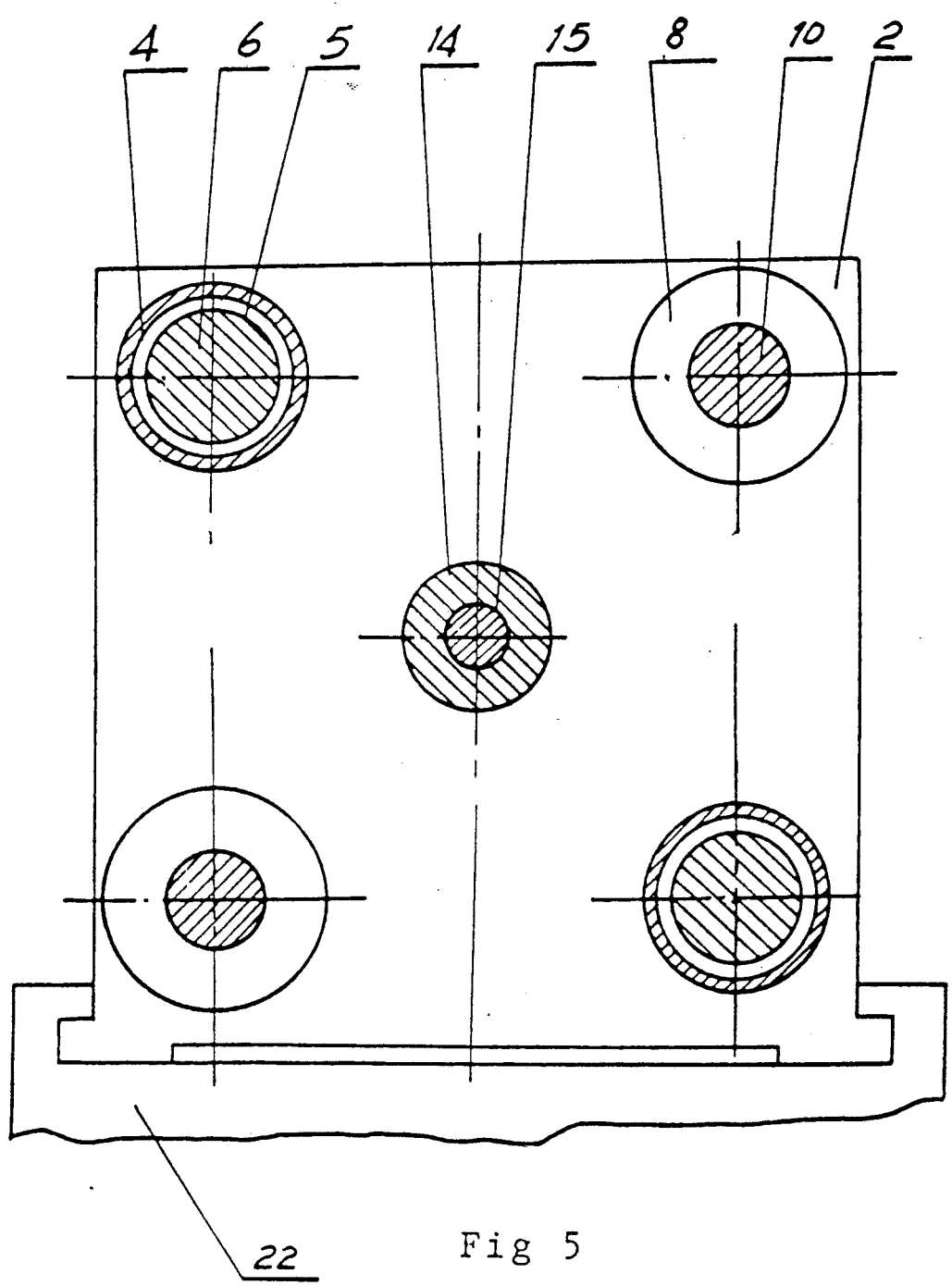
FIG. 5 is a sectional schematic view on 5—5 of FIG. 1.
Figure 6:
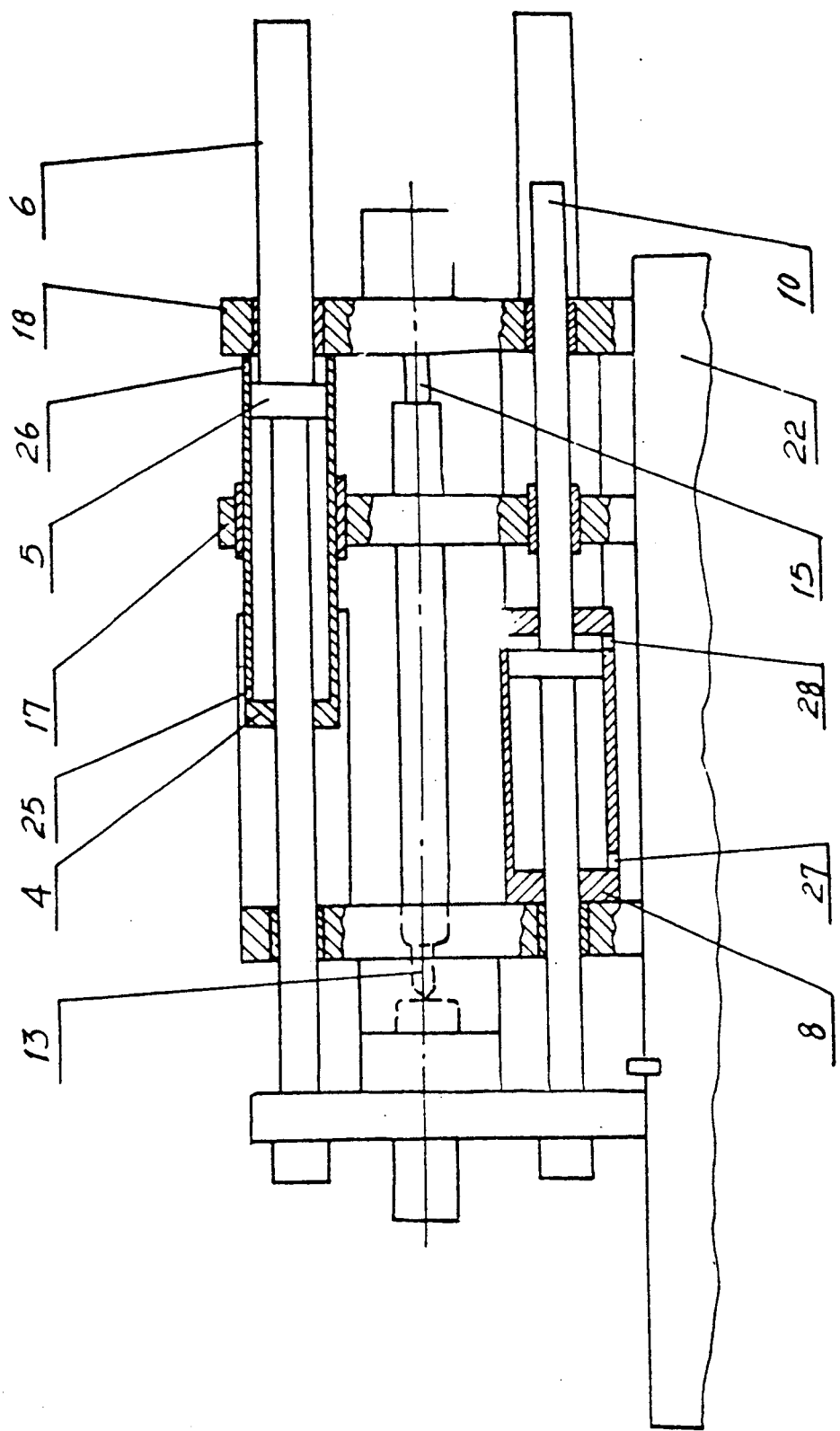
FIG. 6 is a schematic view of the present invention when the injection is completed (injection stand is fixed)

Injection process: following the above process, high pressure oil keeps flowing into the general oil cylinder 4 through its left oil port 25, and the piston 5 keeps on moving rightward. The tension rod 3 drives the mold plates 1 and 2 to move rightward to push the charging cylinder 14 and the injection stand 17 rightward. Because the screw stem driving device 16 connected with the screw stem 15 is fixed on the driving stand 18 and cannot move rightward, the screw stem 15 moves leftward relative to the charging cylinder 14, and the melted materials are compressed and injected into the molding chamber with high speed and high pressure (as shown in FIG. 4). The pressure of the injection force can be used to lock molds.

After the pressure is maintained and cooled, the left oil port 25 of the general oil cylinder 4 communicates with the zero-potential oil tank, and the high pressure oil is then guided to flow into the general oil cylinder through its right oil port 26. The left oil port 27 and right oil port 28 of the mold-locking oil cylinder 8 communicate with the zero-potential oil tank, so that the integrated recession, mold-separating and technological processes can be completed. When the high pressure oil keeps flowing into the general oil cylinder 4, the continuous motion of the piston 5 in the general oil cylinder 4 can drive the tension rod 3 to complete mold-matching, mold separating, integrated movement, integrated recession and injection etc. and technological processes continuously without the transformation of various motions.

Another embodiment of the present invention is similar to the above first embodiment (as shown in FIG. g). The difference is that the injection stand 17 is fixed on the frame guide track 22. When high pressure oil flows into the general oil cylinder 4 through left oil port 25, the piston 5 in the general oil cylinder moves rightward, and the first mold plate 1 moves rightward to match molds. At the same time, the high pressure oil flows into the mold-locking oil cylinder 8 through left oil port 27 to lock molds. Because the high pressure oil keeps on flowing into the general oil cylinder through left oil port 25, the piston 5 keeps moving rightward, and the integrated rightward movement of the mold plates can be completed. When the nozzle 13 touches the pouring head, the charging cylinder 14 is pressed, and because the charging cylinder 14 is fixed on the injection stand 17, and the injection stand 17 is fixed on the frame, the piston cannot move rightward, and the reaction force of the high pressure oil drives the cylinder together with the driving stand 18 to move leftward. The screw stem 15 also moves leftward to press the melted materials to inject from the nozzle 13 into the molding chamber with high pressure and high speed.

Figure 7:
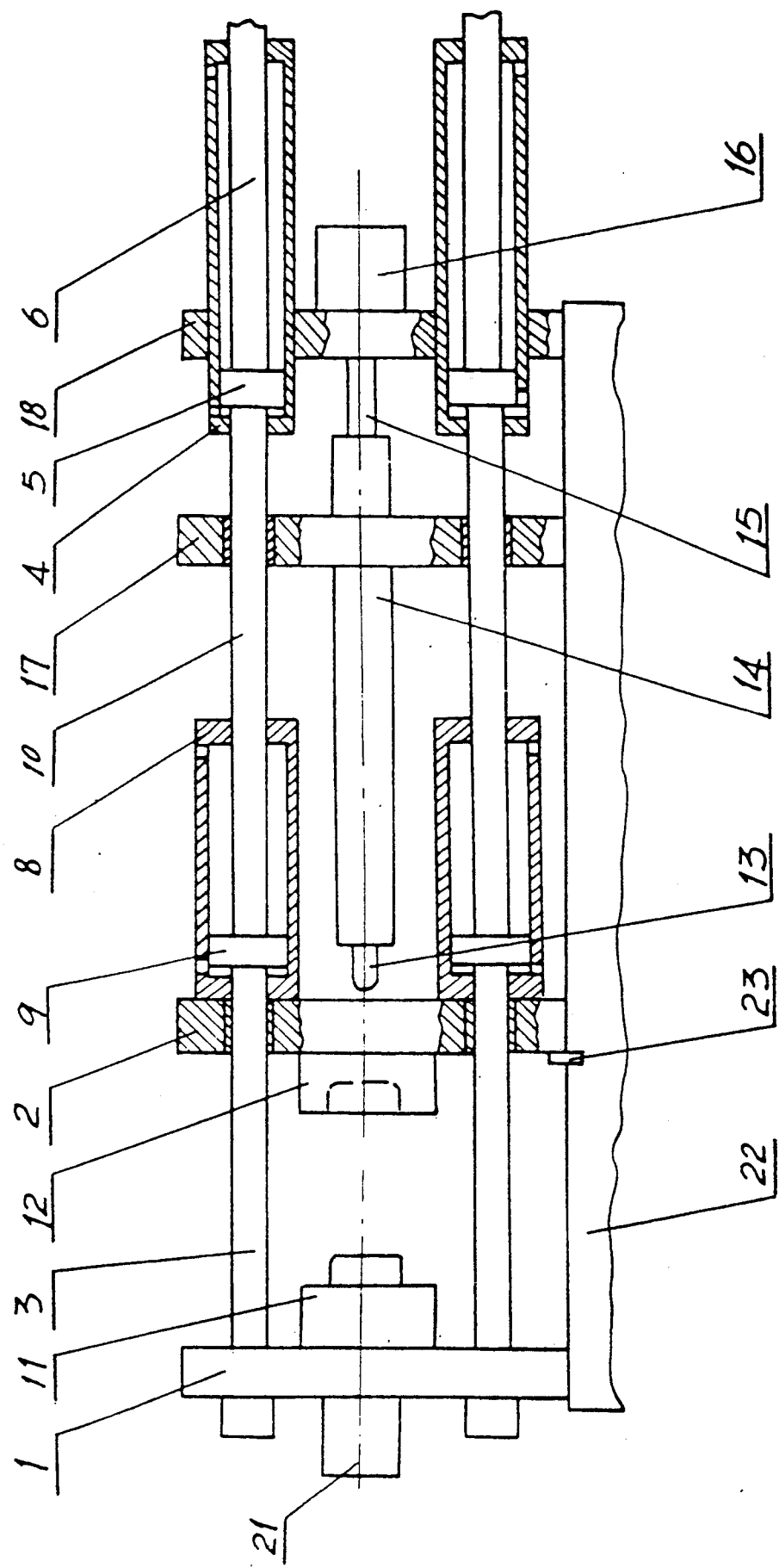
FIG. 7 is a schematic view of the present invention when the oil cylinders are fixed on the same tension rod.

Third embodiment of the present invention (as shown in FIG. 7) is similar to first embodiment. The difference is that the pistons 9 in two or four mold-locking oil cylinders 8 are concentrically connected with the pistons 5 in two or four general oil cylinders 4, i.e., the front piston rod of the mold-locking oil cylinder 8 is the tension rod 3, and its rear piston rod is the front piston rod of the piston 5 in the general oil cylinder 4. There are two movable mold plates: first movable mold-plate 1 and second movable mold plate 2 in said mold-matching device, which are slidingly and vertically mounted on the frame guide track, and can move reciprocally along the guide track. A pair of split molds are fixed on the facing sides of the first movable mold plate 1 and second movable mold plate 2 respectively. Several tension rods 3 are arranged parallel on first movable mold plate 1 and second movable mold plate 2; the left end of tension rod 3 is fixed on the first movable mold plate 1, and the right end of tension rod 3 is concentrically connected with the left end of the piston in each mold-locking oil cylinder 8, respectively. At the same time, the piston in the mold-locking oil cylinder 8 is concentrically connected with the piston in the general oil cylinder 4. Therefore, the rear piston rod 10 of the piston in the mold-locking oil cylinder is the front piston rod 10 of the piston in the general oil cylinder; tension rod 3 crosses through second movable mold plate 2, and the second movable mold plate is fitted with the right part of the tension rod 3 so that they can move relatively. A driving stand 18 is fixed on the other end of the frame guide track 22 relative to first movable mold plate 1, and the injection stand 17 is slidingly and vertically mounted on the frame guide track between second movable mold plate 2 and the driving stand 18 and can move along the frame guide track. Several general oil cylinders 4 are fixed on driving stand 18 and are arranged axisymmetrically around the center of said mold plate, and the front piston rod of the piston in the general oil cylinder passes through the injection stand 17 and can slide in it. Several mold-locking oil cylinders 8 are fixed on the right side of second movable mold plate 2 between the second movable mold plate 2 and the injection stand 17 and are arranged axisymmetrically around the center of said mold plate and concentrically correspond to said general oil cylinders. The rear piston rod of the piston in the mold-locking oil cylinder 8 (i.e., the front piston rod of the piston in the general oil cylinder) passes through the injection stand 17 and can slide in it; said injection device comprises a nozzle 13, a charging cylinder 14, a screw stem 15, which are mounted on the injection stand 17 and can move together with it. Nozzle 13 is fixed on the end of the charging cylinder 14 and toward the pouring head on the second movable mold plate 2, and a screw stem of the screw stem driving device fixed on the driving stand is mounted in said charging cylinder and can rotate and slide in it.

The advantages of the present invention are following:

1. Mold-matching, mold-separating, integrated movement, integrated recession and injection, and technological processes are completed continuously, so as to transform various motions and hydraulic impulsive force, so it is easy to realize automation.

2. The pressure of the injection can be used to lock mold, so the mold-matching force increases.

3. There are only two mold plates in the device so as to decrease the total length of the device and its weight, so the device is compact in structure and low in manufacturing cost.

4. The hydraulic circuit is simple, so the number of valves is few and it is easy to maintain.

5. The device can be used not only with piston injection molders and screw injection molders, but also with other special injection molders or precision injection molders for special uses.

What is claimed is:

1. An injection molding apparatus with two movable molds comprising:
   a mold-matching device, an injection device, a hydraulic system and an electric control system, said mold matching device comprises two movable mold plates arranged in said mold-matching device, said two movable mold plates comprising a first movable mold plate and a second movable mold plate, said two movable mold plates are slidingly and vertically mounted on a frame guide track and move along the frame guide track reciprocally;
   a pair of split molds mounted on facing sides which correspond to said first movable mold plate and said second movable mold plate; a facing side of the first movable mold plate facing the second movable mold plate; a facing side of the second movable mold plate facing the first movable mold plate;
   a plurality of tension rods arranged in a parallel relationship on said first movable mold plate and said second movable mold plate; left ends of said tension rods fixed on the first movable mold plate, a right end of a first tension rod being concentrically connected with a left end of a piston in a first general oil cylinder, a right end of a second tension rod concentrically connected with a left end of a piston in a first mold-locking oil cylinder, said tension rods being fixed on the first movable mold plate and passing through the second movable mold plate, said second movable mold plate being fitted with a middle part of the tension rod, said first and second movable mold plates moving relative to each other;

a driving stand being vertically fixed on an end of said frame guide track relative to the first movable mold plate;

an injection stand mounted slidingly and vertically on the frame guide track between the driving stand and the second movable mold plate, said injection stand being movable along the frame guide track;

additional general oil cylinders fixed on a left side of the driving stand between the driving stand and the second movable mold plate, said first and said additional general oil cylinders being slidingly inserted in the injection stand which can move relative to said first and the additional general oil cylinders, each of said first and said additional general oil cylinders arranged axisymmetrically around a center of said movable mold plate; and a rear piston rod of a first piston in said first general oil cylinder passing through the driving stand and sliding in said driving stand;

additional mold-locking oil cylinders fixed on a right side of the second movable mold plate and between the second movable mold plate and the injection stand, said first and said additional mold locking oil cylinders being arranged axisymmetrically around the center of said movable mold plate, said first and said additional mold locking oil cylinders being interlaced with said first and said additional general oil cylinders; and a rear piston rod of a piston in said first mold-locking oil cylinder passing through the injection stand and sliding in said injection stand;

said injection device comprises a nozzle, a charging cylinder, and screw stem, said charging cylinder is fixed on the injection stand and moves together with said injection stand, said nozzle being fixed on an end of said charging cylinder and oriented toward a pouring head of the second movable mold plate, the screw stem of a screw stem driving device fixed on said driving stand, mounted in said charging cylinder and rotatable, said screw stem sliding in said charging cylinder at a predetermined distance slightly greater than a sum of the stroke of the first movable mold plate, a maximum distance between the mold pouring head and the nozzle and an injection stroke of the screw stem.

2. An injection molding apparatus with two movable molds, comprising:

a mold-matching device, an injection device, a hydraulic system and an electric control system, said mold-matching device comprises only two movable mold plates arranged in said mold-matching device, said two movable mold plates comprising a first movable mold plate and a second movable mold plate, said first and second movable mold plates being slidingly and vertically mounted on a frame guide track and moving along the frame guide track reciprocally;

a pair of split molds mounted on facing sides which correspond to said first movable mold plate and said second movable mold plate, a facing side of the first movable mold plate facing the second movable mold plate, and a facing side of the second movable mold plate facing the first movable mold plate;

a plurality of tension rods arranged in a parallel relationship on the first movable mold plate and the second movable mold plate, left ends of said tension rods fixed on the first movable mold plate, a right end of a first tension rod being concentrically connected with a left end of a piston in a first general oil cylinder, a right end of a second tension rod concentricallly connected with a left end of a piston in a first mold-locking oil cylinder, said tension rods passing through the second movable mold plate, and the second movable mold plate being fitted with a middle part of the tension rods and said first and second movable mold plates moving relative to one another;

a driving stand vertically fixed on an end of the frame guide track relative to the first movable mold plate;

an injection stand mounted slidingly and vertically on the frame guide track between the driving stand and the second movable mold plate, the injection stand moving along the frame guide track;

additional general oil cylinders fixed on the left side of the driving stand between the driving stand and the second movable mold plate, said first and said additional general oil cylinders being slidingly inserted in the injection stand which can move relative to said first and said additional general oil cylinders, said first and said additional general oil cylinders arranged axisymmetrically around the center of said second movable mold plate; a rear piston rod of the piston in said first general oil cylinder passing through the driving stand, said first and said additional general oil cylinders being slidable in said driving stand;

additional mold-locking oil cylinders fixed on the right side of the second movable mold plate between the second movable mold plate and said injection stand, said first and said additional mold locking oil cylinders being also arranged axisymmetrically around the center of said movable mold plate, said first and said additional mold-locking oil cylinders being interlaced with said first and said additional general oil cylinders; and a rear piston rod of the piston in each of said first and said additional mold-locking oil cylinders passing through the injection stand and sliding in said injection stand;

said injection device comprises a nozzle, a charging cylinder and a screw stem, said charging cylinder is fixed on the injection stand and moves together with said injection stand, said nozzle being fixed on an end of said charging cylinder and being oriented toward a pouring head of the second movable mold plate, the screw stem of the screw stem driving device being fixed on said driving stand and being mounted in said charging cylinder, said screw stem rotating and sliding in said charging cylinder; wherein a maximum stroke of said first general oil cylinder is equal to a sum of a stroke of the first movable mold plate, a maximum distance between the mold pouring head and the nozzle and an injection stroke of the screw stem.

3. An injection molding apparatus with two movable molds, comprising:

a mold-matching device, an injection device, a hydraulic system and an electric control system, only two movable mold plates are arranged in said mold-matching device, said two movable mold plates comprising a first movable mold plate and a second movable mold plate, said first and second movable mold plates being slidingly and vertically mounted on a frame guide track and moving along the frame guide track reciprocally;

a pair of split molds mounted on facing sides which correspond to the first movable mold plate and the second movable mold plate, a facing side of the first movable mold plate facing the second movable mold plate, a facing side of the second movable mold plate facing the first movable mold plate;

a plurality of tension rods arranged in a parallel relationship on said first movable mold plate and said second movable mold plate, left ends of said tension rods being fixed on the first movable mold plate, a right end of a first tension rod being concentrically connected with a left end of a piston in a first general oil cylinder, a right end of a second tension rod concentrically connected with a left end of a piston in a first mold-locking oil cylinder, said tension rods being fixed on the first movable mold plate and passing through the second movable mold plate, the second movable mold plate being fitted with a middle part of the tension rods, said tension rods and the second movable mold plate moving relative to each other;

a driving stand mounted slidingly and vertically on an end of the frame guide track relative to the first movable mold plate;

an injection stand vertically fixed on the frame guide track between the driving stand and the second movable mold plate;

additional general oil cylinders fixed on the left side of the driving stand between the driving stand and the second movable mold plate, said first and said additional general oil cylinders being slidingly inserted in the injection stand and moving relative to the injection stand, each of said first and said additional general oil cylinders arranged axisymmetrically around a center of said second movable mold plate;

a rear piston rod of the piston in said first general oil cylinder passing through the driving stand and sliding in said driving stand;

additional mold-locking oil cylinders fixed on a right side of the second movable mold plate between the second movable mold plate and the injection stand, said first and said additional mold locking oil cylinders are also arranged axisymmetrically around a center of said movable mold plate; said first and said additional mold locking oil cylinders being interlaced with said first and said additional general oil cylinders; and a rear piston rod of the piston in said first mold-locking oil cylinder passing through the injection stand and sliding in said injection stand, said injection device comprises a nozzle, a charging cylinder, a screw stem, said charging cylinder is fixed on the injection stand and moves together with said injection stand, said nozzle being fixed on an end of said charging cylinder and toward a pouring head of the second movable mold plate, the screw stem of the screw stem driving device fixed on said driving stand being mounted in said charging cylinder, the screw stem rotating and sliding in said charging cylinder.

4. An injection molding apparatus with two movable molds comprising:

a mold-matching device, an injection device, a hydraulic system and an electric control system, said mold matching device comprises two movable mold plates, said two movable mold plates comprising a first movable mold plate and a second movable mold plate, said first and second movable mold plates being slidingly and vertically mounted on the frame guide track and moving reciprocally along the guide track;

a pair of split molds, fixed on the facing side of said first movable mold plate and said second movable mold plate respectively, a facing side of the first movable mold plate facing the second movable mold plate and a facing side of the second movable mold plate facing the first movable mold plates;

a plurality of tension rods arranged in a parallel relationship on the first movable mold plate and the second movable mold plate, left ends of said tension rods fixed on the first movable mold plate, a right end of a first tension rod being concentrically connected with a left end of a piston in a first general oil cylinder, a right end of a second tension rod concentrically connected with a left end of a piston in a first mold-locking oil cylinder, teh piston in the first mold-locking oil cylinder is concentrically connected with the piston in the first general oil cylinder, a rear piston rod of the piston in the first mold-locking oil cylinder is a front piston rod of the piston in the first general oil cylinder, said tension rods being fixed on the first movable mold plate and passing through the second movable mold plate, the second movable mold plate being fitted with a right part of the tension rod, said tension rod and said second movable mold plate moving relative to each other;

a driving stand fixed on an end of the frame guide track relative to the first movable mold plate;

an injection stand mounted slidingly and vertically on the guide track between the second movable mold plate and the driving stand which can move along the guide track;

additional general oil cylinders fixed on said driving stand and arranged axisymmetrically around the center of said mold plate; and a front piston rod of the piston in the first general oil cylinder crossing through the injection stand and sliding in the injection stand;

additional mold-locking oil cylinders fixed on a right side of the second movable mold plate between the second movable mold plate and the injection stand, said first and said additional mold-locking oil cylinders being arranged axisymmetrically around the center of said mold plate and concentrically corresponding to said first and said additional general oil cylinders, the rear piston rod of the piston in the first mold-locking oil cylinder passing through the injection stand and sliding in the injection stand, said injection device comprises a nozzle, a charging cylinder and a screw stem, said charging cylinder being mounted on the injection stand and moving together with the injection stand, the nozzle being fixed on the end of the charging cylinder and oriented toward a pouring head on the second movable mold plate, a screw stem of the screw stem driving device fixed on the driving stand is mounted in said charging cylinder, said screw stem rotating and sliding in said charging cylinder.

5. An injection molding apparatus with two movable molds comprising:

a mold-matching device, an injection device, a hydraulic system and an electric control system, said mold matching device comprises two modable mold plates arranged in said mold-matching device, said two movable mold plates comprising a first movable mold plate and a second movable mold plate, said two movable mold plates are slidingly and vertically mounted on a frame guide track and move along the frame guide track reciprocally;

a pair of split molds mounted on facing sides which correspond to said first movable mold plate and said second movable mold plate; a facing side of the first movable mold plate facing the second movable mold plate; a facing side of the second movable mold plate facing the first movable mold plate;

a plurality of tension rods arranged in a parallel relationship on said first movable mold plate and said second movable mold plate; left ends of said tension rods fixed on the first movable mold plate, a right end of a first tension rod being concentrically connected with a left end of a piston in a general oil cylinder, a right end of a second tension rod concentrically connected with a left end of a piston in a mold-locking oil cylinder, said tension rods being fixed on the first movable mold plate and passing through the second movable mold plate, said second movable mold plate being fitted with a middle part of the tension rod, said first and second movable mold plates moving relative to each other;

a driving stand being vertically fixed on an end of said frame guide track relative to the first movable mold plate;

an injection stand mounted slidingly and vertically on the frame guide track between the driving stand and the second movable mold plate, said injection stand being movable along the frame guide track; and a rear piston rod of a piston in said mold-locking oil cylinder, passing through the injection stand and sliding in said injection stand;

said injection device comprises a nozzle, a charging cylinder, and screw stem, said charging cylinder is fixed on the injection stand and moves together with said injection stand, said nozzle being fixed on an end of said charging cylinder and oriented toward a pouring head of the second movable mold plate, the screw stem of a screw stem driving device fixed on said driving stand, mounted in said charging cylinder and rotatable, said screw stem sliding in said charging cylinder at a predetermined distance slightly greater than a sum of the stroke of the first movable mold plate, a maximum distance between the mold pouring head and the nozzle and an injection stroke of the screw stem.

6. An injection molding apparatus with two movable molds as claimed in claim 1, 2 or 3, wherein said plurality of tension rods are a front piston rod of the piston in the first general oil cylinder and a front piston rod of the piston in the first mold-locking oil cylinder, said tension rods being integrated with said pistons.

7. An injection molding apparatus with two movable molds as claimed in claim 1, 2, 3 or 4 wherein the total number of said first and said additional general oil cylinder is two and the total number of said first and additional mold locking oil cylinders is two.

8. An injection molding apparatus with two movable molds as claimed in claim 4, wherein the total number of said first and said additional general oil cylinders is four and the total number of said first and said additional mold locking oil cylinders is four.

* * * * *